Figure 1:
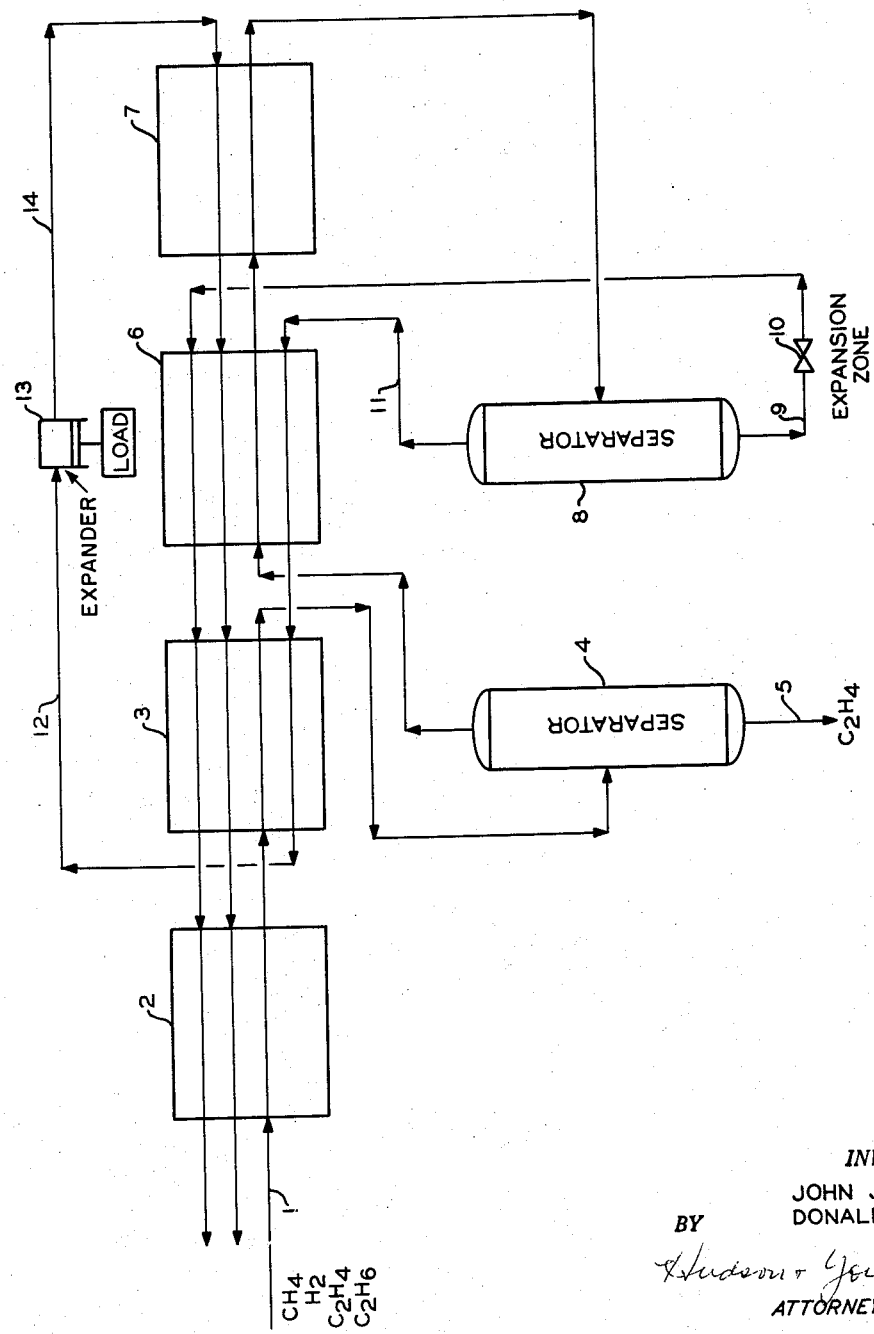

Jan. 28, 1964 J. J. MOON ETAL 3,119,677
SEPARATION OF GASES
Filed Jan. 16, 1961 2 Sheets-Sheet 1

INVENTORS.
JOHN J. MOON
DONALD E. GRIFFIN
BY
*Hudson + Young*
ATTORNEYS

Jan. 28, 1964   J. J. MOON ETAL   3,119,677
SEPARATION OF GASES
Filed Jan. 16, 1961   2 Sheets-Sheet 2

INVENTORS.
JOHN J. MOON
DONALD E. GRIFFIN
BY
*Hudson & Young*
ATTORNEYS

United States Patent Office 3,119,677
Patented Jan. 28, 1964

3,119,677
SEPARATION OF GASES
John J. Moon and Donald E. Griffin, Bartlesville, Okla., assignors to Phillips Petroleum Company, a corporation of Delaware
Filed Jan. 16, 1961, Ser. No. 83,104
3 Claims. (Cl. 62—23)

This invention relates to separation of gases. In one of its aspects, the invention relates to the separation of hydrogen from hydrocarbon gases. In another of its aspects, the invention relates to means in combination for effectively separating hydrogen from hydrocarbon gases containing the same. In a further aspect of the invention, it relates to a process for the recovery of hydrogen from a mixture of gases containing the same and hydrocarbons by progressively condensing from the mixture of gases, the hydrocarbon gases, obtaining a hydrogen stream, heat-exchanging the hydrogen stream with the gases being refrigerated, then expanding the hydrogen stream, and then using the hydrogen stream which has been expanded as a further refrigerant for the gases undergoing refrigeration. In a still further aspect of the invention, it relates to process and means involving a plurality of separation steps intermediate which are provided heat-exchange sections wherein a gas containing essentially hydrogen, methane, acetylene, ethylene, ethane, propylene, propane, butene, butadiene and some higher boiling material are separated into an ethylene product stream, an ethane product stream, a methane product stream, and a hydrogen product stream, the hydrogen product stream being obtained at a low temperature-high pressure separation of hydrogen from methane in a gas containing substantially only hydrogen and methane, the hydrogen being used for heat interchange of gases being refrigerated in the system, then being expanded, as in a turbine doing work, and then further used as a refrigerant to refrigerate the gases at various points in the heat interchange sections.

It is known to initially cool a gas under pressure to separate a condensate from said gas, to expand the remaining gas to produce further condensate and a remainder gas, and to use the remaining gas to effect the initial cooling. In such a system which has been proposed, the expansion is used to power a refrigeration system which contributes refrigerant to the system for chilling the cooled remaining gas prior to the expanding thereof.

We have now conceived a system for the separation of gases, for example, the separation of hydrogen from a gas containing the same, methane, ethane, ethylene, etc., wherein the feed is cooled at an elevated pressure and to a temperature such that a condensate is obtained, the condensate is separated containing a substantial portion of the ethylene in the example given, the remaining gas is further cooled to a temperature at which additional condensate is obtained and separated containing methane, ethylene and ethane in the example given, yielding a residual gas stream containing essentially hydrogen, in the example given, the residual gas stream is passed into heat exchange with feed to the system, expanded to produce a refrigerant stream and the refrigerant stream, thus obtained, is passed into heat exchange with feed to the system. Thus, the hydrogen which is separated as a residual gas stream in the system is used prior to its expansion as a refrigerant and then again after its expansion as a further refrigerant. By incorporating an intermediate expansion step in the use of the residual hydrogen gas stream as a refrigerant, there is made possible advantageous utility of the residual hydrogen stream substantially throughout the entire series of heat exchanges leading to its separation. This is to be contrasted with the use of the hydrogen which is obtained upon an expansion at an intermediate point of gas separation, with further separation of liquid from gas and use of ultimately obtained hydrogen to cool incoming feed to give it its initial cooling, as above discussed.

It is an object of this invention to separate gases. It is another object of this invention to provide a process for the separation of gases. It is another object of this invention to provide means in combination for the separation of gases. It is a further object of this invention to provide for the recovery of hydrogen from a mixture of gases containing the same and hydrocarbon gases such as methane, ethane, ethylene, acetylene, propylene, propane, butene, butadiene, etc. It is a further object of the invention to provide for the recovery of hydrogen from a mixture of gases containing the same in a manner such that the hydrogen can be utilized more fully for refrigeration value which it possesses. It is a still further object of the invention to so recover hydrogen that it is obtained as a residual gas at the end of a series of heat interchanges so that it can be used for heat exchange purposes throughout the series of heat interchanges.

Other aspects, objects and the several advantages of the invention are apparent from a study of this disclosure, the drawings and the appended claims.

According to the present invention, there is provided a process for the recovery of hydrogen from a gas containing the same and low-boiling hydrocarbons including methane, ethane, and ethylene which comprises progressively cooling said gas and refrigerating the same to condense therefrom substantially all of the hydrocarbon constituents, obtaining a residual hydrogen gas stream at a low temperature and at a high pressure, heat interchanging the hydrogen thus obtained with incoming gas feed to aid in the refrigeration of the gas feed, expanding hydrogen thus used for refrigeration to produce a relatively low pressure and low temperature refrigerant stream, and then using the last-obtained refrigerant stream for further refrigeration of incoming gases. More specifically, the invention involves a method for the recovery of hydrogen from a gas containing low-boiling hydrocarbons including methane, ethane, and ethylene which comprises cooling said gas to a temperature at an elevated pressure such that a substantial proportion of the ethylene is condensed, separating the condensate from said gas, passing the condensate to a zone in which demethanization thereof is effected, cooling gas from which condensate has been separated to a temperature at which substantially the remainder of the ethane, ethylene and a substantial proportion of the methane are condensed, separating condensed ethane, ethylene and methane from said gas, passing condensed ethane, ethylene and methane, thus obtained, in heat exchange with feed to the process, passing the remainder of gas, from which substantially all ethylene, ethane and methane have been separated, into heat exchange with cooled feed to the process, then expanding said remainder of the gas, from which substantially all ethylene, ethane and methane have now been separated, thus producing a refrigerant stream and passing said refrigerant stream in heat exchange with feed to the process.

Figure 2:
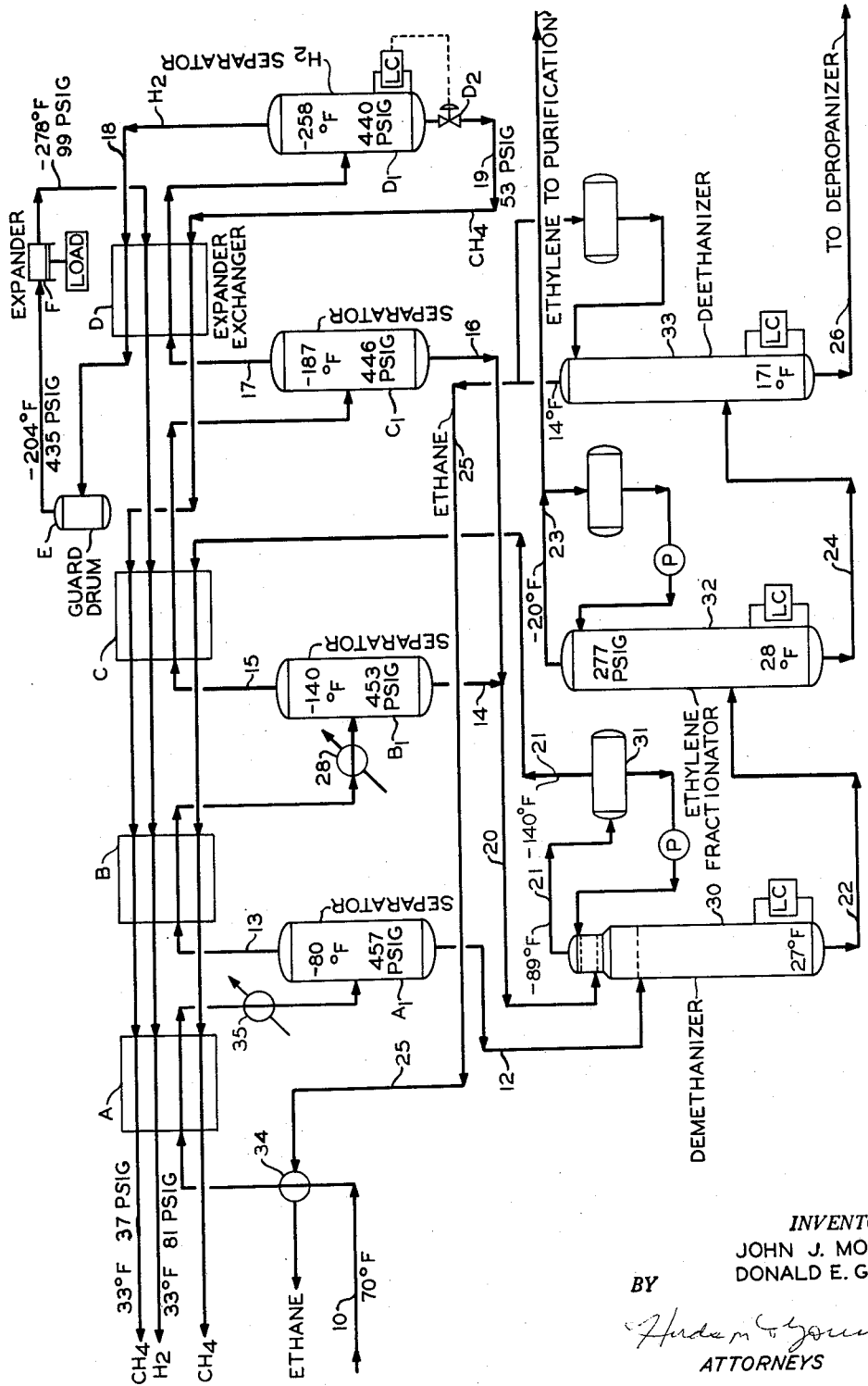

Referring now to the drawings, FIGURE 1 shows diagrammatically and in a simplified form a flow plan according to the invention in which a liquid stream containing essentially all the ethylene and associated hydrocarbon is separated prior to further cooling to obtain, upon expansion, after all steps of heat interchange, a residual hydrogen gas stream and a condensate consisting essentially of methane and ethane. In FIGURE 2, there is shown a more detailed diagram of flow wherein there is progressively separated from the incoming feed a series of condensates resulting in a final gas from liquid separation yielding a residual hydrogen gas stream and a liquid methane stream.

Referring now to FIGURE 1, 1 is a gas feed containing hydrogen, methane, ethane, ethylene, etc., which, after passing through heat interchange sections 2 and 3, is passed to liquid hydrocarbon separator 4 from which a condensate containing essentially all the ethylene is removed at 5. Overhead from 4 passes through heat interchangers 6 and 7 to gas separator 8 from which a liquid bottoms containing methane and ethane is passed by way of pipe 9 and expansion zone 10 through heat interchange sections 6, 3 and 2 and from the system. Overhead gas from 8 consisting essentially of hydrogen is passed by pipe 11 into heat interchange zone 6, then through heat interchange zone 3 and then by pipe 12 to expansion zone 13 and pipe 14 to heat interchange zone 7, and from zone 7 through zones 6, 3 and 2, thus accomplishing heat interchange in all heat interchange zones. Such a flow is made possible by the arrangement, according to the invention, in which the hydrogen is separated as the residual gas and in which the hydrogen is heat interchanged with incoming feed through a portion of the available heat interchange zones, then expanded and then brought back, as it were, for heat interchange all the way along the line of heat interchange zones.

Referring now to FIGURE 2, feed 10 is heat exchanged with product ethane and then passes through heat interchange zone A into separator $A_1$ in which, under the conditions indicated, there is obtained a liquid containing a major amount of the ethylene and ethane in feed 10. This liquid is passed to demethanizer 30 for treatment as later described. Vapor 13 from separator $A_1$ is passed to heat interchange zone B. In zone B, this vapor which contains a substantial amount of ethylene and ethane, methane and hydrogen is further refrigerated and passed to separator $B_1$ from which a liquid, containing some methane and a major proportion of the ethylene in the stream cooled in zone B, is also passed to demethanizer 30 for treatment, as later described. Vapor 15 from zone $B_1$ is passed to heat interchange zone C wherein the vapor, containing substantial amounts of hydrogen and methane, is further refrigerated and passed to separator $C_1$ from which additional ethylene and ethane and some methane are removed as a liquid to demethanizer 30 for treatment as later described. Vapor 17 from zone $C_1$ containing now essentially hydrogen and methane, is passed by way of heat interchange zone D to separator $D_1$ from the bottom of which stream 19, containing essentially methane, is passed by way of expansion zone $D_2$ into heat interchange with gases passing through zones D, C, B and A. Overhead stream 18 from zone $D_1$ is passed through heat interchange zone D into guard drum E and then through expander F and then back to zone D and thence through zones C, B and A, thus being utilized twice for heat interchange purposes. One utilization for heat exchange purposes is before expansion and the other after expansion. By positioning, according to the inventive concept, the hydrogen separation to take place as a last separation, and employing intermediate expansion thereof, the hydrogen is utilized twice in zone D and at least once in each of the remaining zones.

From demethanizer 30, overhead 21 is passed by way of accumulator 31 to heat interchange zone C and from zone C to through zones B and A and from the system. Bottoms 22 from demethanizer 30 are passed to ethylene fractionator 32 from which ethylene overhead 23 is passed as a product of the system to purification. Bottoms 24 from fractionator 32 are passed to deethanizer 33 from which overhead ethane stream 25 is passed through heat exchanger 34 for heat exchange with incoming feed and then recovered from the system. Bottoms from deethanizer 33 contain hydrocarbons heavier than ethane and are passed to a depropanizer, not shown for sake of simplicity, for recovery of further gas fractions as may be desired.

The following table shows the composition of the streams in the flow diagram of FIGURE 2:

*Table*

| | 10 Gas From Dehydrators | | 12 −80 F. Liquid | | 13 −80 F. Vapor | | 14 −140 F. Liquid | | 15 −140 F. Vapor | | 16 −186 F. Liquid | |
|---|---|---|---|---|---|---|---|---|---|---|---|---|
| | Mol/Hr. | Lb./Hr. | Mol/Hr. | Lb./Hr. | Mol/Hr. | Lb./Hr. | Mol/Hr. | Lb./Hr. | Mol/Hr. | Lb./Hr. | Mol/Hr. | Lb./Hr. |
| Hydrogen | 1,157.9 | 2,316 | 25.7 | 51 | 1,132.2 | 2,265 | 7.6 | 15 | 1,124.6 | 2,250 | 2.8 | 6 |
| Methane | 464.2 | 7,427 | 140.0 | 2,240 | 324.2 | 5,187 | 70.0 | 1,120 | 254.2 | 4,067 | 52.4 | 838 |
| Acetylene | 16.8 | 437 | 12.5 | 325 | 4.3 | 112 | 3.2 | 83 | 1.1 | 29 | 1.1 | 29 |
| Ethylene | 1,043.5 | 29,218 | 777.7 | 21,776 | 265.8 | 7,442 | 198.8 | 5,566 | 67.0 | 1,876 | 54.4 | 1,523 |
| Ethane | 812.8 | 24,384 | 672.0 | 20,160 | 140.8 | 4,224 | 116.3 | 3,489 | 24.5 | 735 | 21.4 | 642 |
| Propylene | 25.1 | 1,054 | 24.1 | 1,012 | 1.0 | 42 | 1.0 | 42 | | | | |
| Propane | 16.0 | 704 | 15.6 | 686 | 0.4 | 18 | 0.4 | 18 | | | | |
| Butene | 3.4 | 190 | 3.4 | 190 | | | | | | | | |
| Butadiene | 13.7 | 740 | 13.7 | 740 | | | | | | | | |
| $C_5+$ | 10.0 | 780 | 10.0 | 780 | | | | | | | | |
| Total | 3,563.4 | 67,250 | 1,694.7 | 47,960 | 1,868.7 | 19,290 | 397.3 | 10,333 | 1,471.4 | 8,957 | 132.1 | 3,038 |

| | 17 −186 F. Vapor | | 18 Hydrogen | | 19 Recycle Methane | | 20 Demethanizer Secondary Feed | | 21 Demethanizer Overhead | |
|---|---|---|---|---|---|---|---|---|---|---|
| | Mol/Hr. | Lb./Hr. | Mol/Hr. | Lb./Hr. | Mol/Hr. | Lb./Hr. | Mol/Hr. | Lb./Hr. | Mol/Hr. | Lb./Hr. |
| Hydrogen | 1,121.8 | 2,244 | 1,117.7 | 2,236 | 4.1 | 8 | 10.4 | 21 | 36.1 | 72 |
| Methane | 201.8 | 3,229 | 49.6 | 794 | 152.2 | 2,435 | 122.4 | 1,958 | 258.4 | 4,134 |
| Acetylene | | | | | | | 4.3 | 112 | | |
| Ethylene | 12.6 | 353 | 0.2 | 6 | 12.4 | 347 | 253.2 | 7,089 | 6.9 | 193 |
| Ethane | 3.1 | 93 | | | 3.1 | 93 | 137.7 | 4,131 | 0.6 | 18 |
| Propylene | | | | | | | 1.0 | 42 | | |
| Propane | | | | | | | 0.4 | 18 | | |
| Butene | | | | | | | | | | |
| Butadiene | | | | | | | | | | |
| $C_5+$ | | | | | | | | | | |
| Total | 1,339.3 | 5,919 | 1,167.5 | 3,036 | 171.8 | 2,882 | 529.4 | 13,371 | 302.0 | 4,417 |

Table—Continued

| | 22 DEC₁ Bottoms | | 23 Ethylene Frac. OHD. | | 24 Ethylene Frac. Btms. | | 25 Deethanizer OHD. | | 26 Deethanizer Btms. | |
|---|---|---|---|---|---|---|---|---|---|---|
| | Mol/Hr. | Lb./Hr. | Mol/Hr. | Lb./Hr. | Mol/Hr. | Lb./Hr. | Mol/Hr. | Lb./Hr. | Mol/Hr. | Lb./Hr. |
| Hydrogen | | | | | | | | | | |
| Methane | 4.0 | 64 | 4.0 | 64 | | | | | | |
| Acetylene | 16.8 | 437 | 16.8 | 437 | | | | | | |
| Ethylene | 1,024.0 | 28,672 | 1,014.1 | 28,395 | 9.9 | 277 | 9.9 | 277 | | |
| Ethane | 809.1 | 24,273 | 1.0 | 30 | 808.1 | 24,243 | 807.7 | 24,231 | 0.4 | 12 |
| Propylene | 25.1 | 1,054 | | | 25.1 | 1,054 | 3.0 | 126 | 22.1 | 928 |
| Propane | 16.0 | 704 | | | 16.0 | 704 | 1.0 | 44 | 15.0 | 660 |
| Butene | 3.4 | 190 | | | 3.4 | 190 | | | 3.4 | 190 |
| Butadiene | 13.7 | 740 | | | 13.7 | 740 | | | 13.7 | 740 |
| C₅+ | 10.0 | 780 | | | 10.0 | 780 | | | 10.0 | 780 |
| Total | 1,922.1 | 56,914 | 1,035.9 | 28,926 | 886.2 | 27,988 | 821.6 | 24,678 | 64.6 | 3,310 |

One skilled in the art in possession of this disclosure, having studied the same, will recognize that only a minimum amount of external refrigeration is required as a result of utilizing the energy in the gas. Those skilled in the art will readily appreciate the fact that refrigeration costs increase quite rapidly as the refrigeration level lowers. In the system of this invention the external refrigeration systems shown generally at 28 and 35, do not require refrigeration levels below −140° F. The recycle of condensed liquids from the final flash reduces the ethylene loss to a very small value. By separating hydrogen from the cracked gas, according to the invention, the overall refrigeration load is reduced. At the same time, the hydrogen is recovered as a valuable by-product substantially free from methane.

Reasonable variation and modification are possible within the scope of the foregoing disclosure, the drawing and the appended claims to the invention, the essence of which is that a combination of means and steps have been provided wherewith to remove hydrogen as a residual or tail gas stream obtained in the step-wise condensation of hydrocarbon gases containing the same, the hydrogen is used as a refrigerant to refrigerate condensing gases, is then expanded to produce work and again used for refrigeration and can be so used throughout the entire series of heat exchange operations involved substantially as set forth and described herein.

We claim:

1. A process for the recovery of hydrogen from a gas containing low-boiling hydrocarbons including methane, ethane, and ethylene which comprises cooling said gas to a temperature at an elevated pressure such that a substantial proportion of the ethylene is condensed, separating the condensate from said gas, passing the condensate to a zone in which demethanization thereof is effected, passing methane gas obtained from said condensate in said zone into heat exchange with feed and other gaseous streams in the process, cooling gas from which condensate has been separated to a temperature at which substantially the remainder of the ethane, ethylene and a substantial proportion of the methane are condensed, separating condensed ethane, ethylene and methane from said last mentioned gas, passing condensed ethane, ethylene and methane, thus obtained, in heat exchange with feed to the last mentioned separating and with feed to the process, passing the remainder of gas, from which substantially all ethylene, ethane and methane have been separated and which is a stream containing essentially hydrogen which is substantially methane-free, into heat exchange with feed to the last mentioned separating process, then expanding said remainder of the gas, from which substantially all ethylene, ethane and methane have now been separated, thus producing a refrigerant stream and passing said refrigerant stream in heat exchange with feed to the last mentioned separating and with feed to the process.

2. An apparatus for recovering hydrogen from gases containing the same and hydrocarbon gases which comprises, in combination, at least a first heat exchange zone for refrigerating said gases, a liquid separation zone, means for passing refrigerated gases to said liquid separation zone, means for separating gas from a liquid, means for passing liquid from said liquid separation zone to said means for separating gas from a liquid, means for passing a gas separated from said liquid in said means for separating gas from a liquid, into said first heat exchange zone, another means for separating a gas from a liquid, means to pass liquid from said means for separating gas from a liquid to said another means for separating a gas from a liquid, means for recovering a product gas from said another means for separating a gas from a liquid, a further heat exchange zone, means for passing vapors from said liquid separation zone to said further heat exchange zone, a still further heat exchange zone, a further liquid separation zone, means for passing refrigerated gases from the last-mentioned heat exchange zone to said further liquid separation zone, means for passing liquid from said further liquid-separation zone to one of said heat exchange zones, means for passing gas from said further liquid-separation zone to at least the last mentioned one of said heat exchange zones, means for passing the last-mentioned gas through a gas expansion zone, and means for passing the expanded gas through at least the last mentioned one of said further heat exchange zones.

3. A method for the separation and recovery of gases from a mixture containing them, said mixture containing hydrogen and ethylene as gases desired to be recovered as principal products which comprises (a) in an operation using only liquid from vapor or gas separation steps wherein only the vapor or gas and the liquid to be separated therefrom are present during said separation steps;

(b) passing a mixture of gases, containing as principal components thereof hydrogen and ethylene and as other components thereof methane, ethane, propane and other light gases, into heat exchange (A) with methane, ethane and hydrogen, obtained in the method as herein described, so as to obtain partial condensation of said mixture;

(c) passing the partially condensed mixture to a liquid from vapor or gas separation zone (A₁);

(d) obtaining a liquid (12) from said liquid separation zone;

(e) passing said liquid to a demethanization zone (30);

(f) in said demethanization zone demethanizing said liquid;

(g) obtaining a methane stream from said demethanization zone (21);

(h) heat exchanging said methane stream with said mixture (A);

(i) removing demethanized liquid from said demethanizing zone (22);

(j) passing said liquid to an ethylene separation zone (32);

(k) from said ethylene separation zone recovering ethylene as a gaseous product (23) and a liquid containing ethane and propane (24);

(*l*) passing said liquid containing ethane and propane to a de-ethanization zone (33);

(*m*) recovering a liquid (26) containing propane and heavier from said de-ethanization zone;

(*n*) recovering gaseous ethane (25) from said de-ethanization zone;

(*o*) passing said ethane into heat exchange (34) with said mixture as the ethane with which it is initially heat exchanged herein;

(*p*) obtaining, from said liquid from vapor or gas separation zone, a stream of gases (13) separated from said partially condensed mixture;

(*q*) passing said stream of gases into further heat exchange with methane and hydrogen (B), obtained as herein described, to cause partial condensation thereof;

(*r*) passing the last partially condensed material to a further separation zone ($C_1$);

(*s*) obtaining a liquid (16) from said further separation zone;

(*t*) passing the last obtained liquid to said demethanization zone for treatment therein together with the liquid earlier passed thereinto;

(*u*) obtaining a gaseous stream (17) from said further separation zone;

(*v*) heat exchanging (D) the last obtained gaseous stream with methane and hydrogen obtained as herein described, to cause partial condensation thereof;

(*w*) passing the last partially condensed material to another separation zone ($D_1$);

(*x*) obtaining a liquid (19) consisting essentially and substantially of methane from said another separation zone;

(*y*) expanding said liquid ($D_2$), and using it as at least a portion of said methane with which the heat exchange with methane described herein takes place;

(*z*) from said another separation zone ($D_1$) recovering a stream consisting essentially and substantially of hydrogen (18);

(*a-a*) using said hydrogen as the hydrogen in the heat exchange (D) resulting in the said last partially condensed material;

(*b-b*) then expanding (F) said hydrogen;

(*c-c*) heat exchanging the expanded hydrogen in said heat exchange (D) resulting in the said last partially condensed material; and (*d-d*) then using said hydrogen as the hydrogen in the initial heat exchange (A) of hydrogen with said mixture recited herein.

References Cited in the file of this patent
UNITED STATES PATENTS

| | | |
|---|---|---|
| 2,122,238 | Pollitzer | June 28, 1938 |
| 2,471,602 | Arnold | May 31, 1949 |
| 2,557,171 | Bodle et al. | June 19, 1951 |
| 2,567,461 | Aicher | Sept. 11, 1951 |
| 2,880,592 | Davison et al. | Apr. 7, 1959 |
| 2,956,410 | Palazzo et al. | Oct. 18, 1960 |
| 2,973,834 | Cicalese | Mar. 7, 1961 |